No. 12,751. REISSUED FEB. 11, 1908.

F. W. A. VON BORRIES, DEC'D.

T. W. WORSDELL, R. H. LAPAGE & J. C. TAITE, ASSIGNEES.

COMPOUND LOCOMOTIVE.

APPLICATION FILED DEC. 13, 1906. 2 SHEETS—SHEET 1.

Fig. 1.

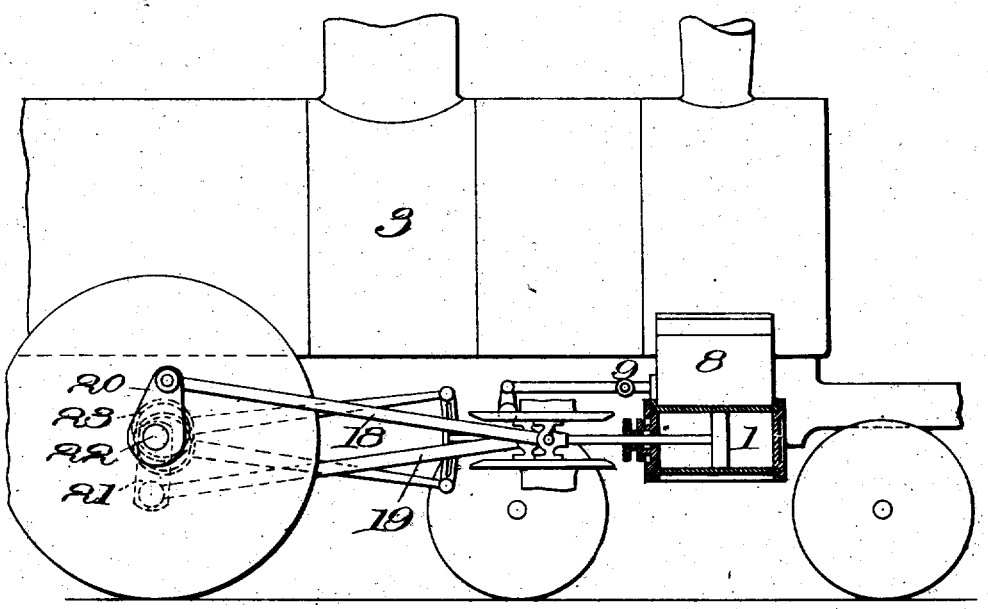

Fig. 2.

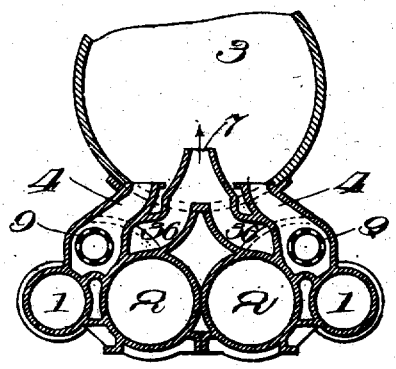

Fig. 9.

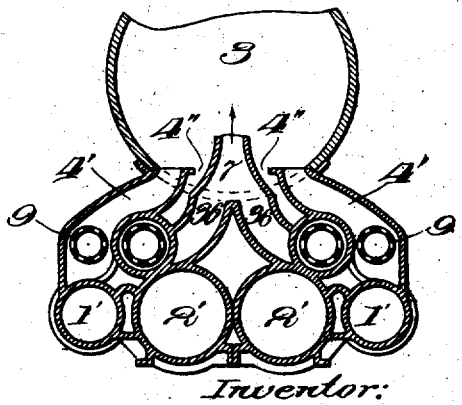

Witnesses:

H. S. Richter

Ruby V. Nash

Inventor:

Friedrich Wilhelm August von Borries Dec'd.

Thomas William Worsdell

Richard Herbert Lapage and John Charles Taite

Assignees by Lambert Wilkinson his Attorneys

THE NORRIS PETERS CO., WASHINGTON, D. C.

No. 12,751. REISSUED FEB. 11, 1908.

F. W. A. VON BORRIES, DEC'D.

T. W. WORSDELL, R. H. LAPAGE & J. C. TAITE, ASSIGNEES.

COMPOUND LOCOMOTIVE.

APPLICATION FILED DEC. 13, 1906.

2 SHEETS—SHEET 2.

Fig. 3.

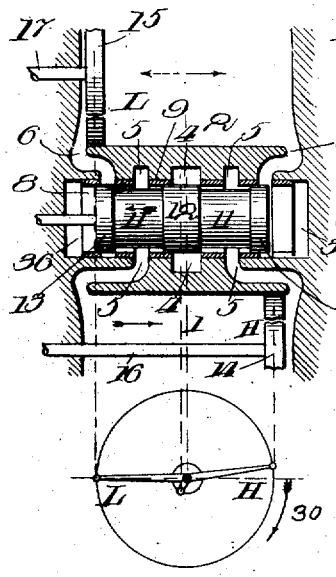

Fig. 4.

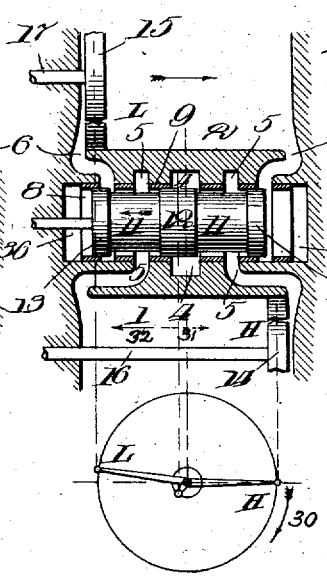

Fig. 5.

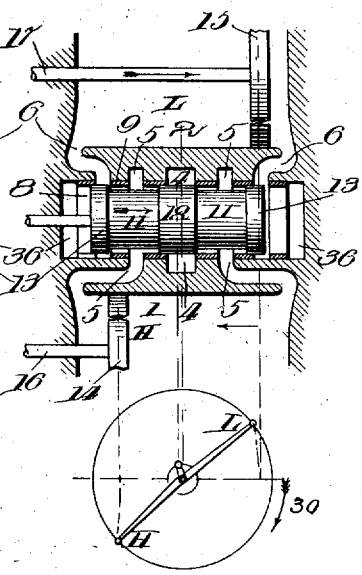

Fig. 6

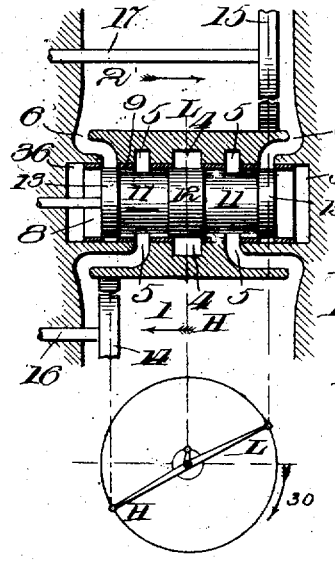

Fig. 7.

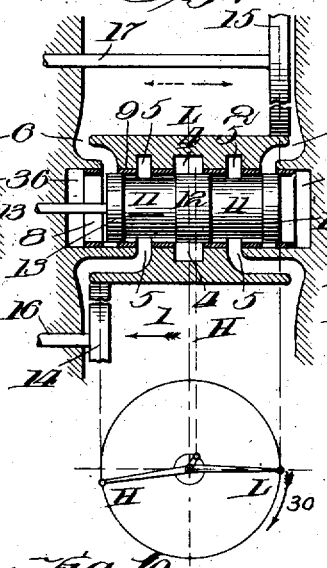

Fig. 8.

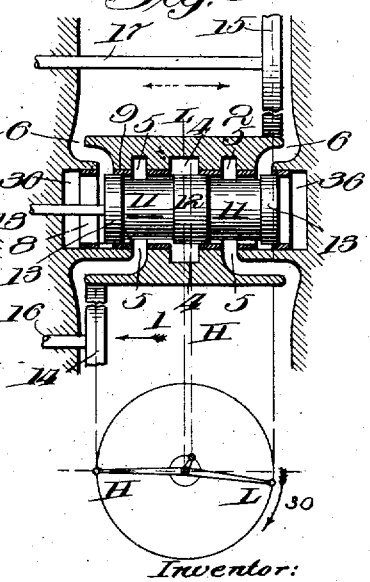

Fig. 10.

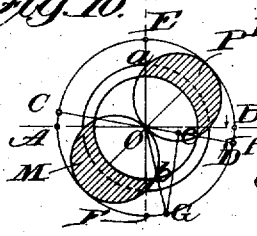

Witnesses:

H. S. Gaither

Ruby V. Nash.

Inventor:

Friedrich Wilhelm August von Borries Dec'd.

Thomas William Worsdell

Richard Herbert Lapage and John Charles Taite

Assignees.

by Lambert & Wilkinson his Attorneys

THE NORRIS PETERS CO., WASHINGTON, D. C.

UNITED STATES PATENT OFFICE.

THOMAS WILLIAM WORSDELL, OF CARNFORTH, RICHARD HERBERT LAPAGE, OF WALMER, AND JOHN CHARLES TAITE, OF LONDON, ENGLAND, ASSIGNEES OF FRIEDRICH WILHELM AUGUST VON BORRIES, DECEASED.

COMPOUND LOCOMOTIVE.

No. 12,751. Specification of Reissued Letters Patent. Reissued Feb. 11, 1908.

Original No. 803,931, dated November 7, 1905, Serial No. 621,831. Application for reissue filed December 13, 1906. Serial No. 347,739.

*To all whom it may concern:*

Be it known that FRIEDRICH WILHELM AUGUST VON BORRIES, deceased, formerly a subject of the King of Prussia, German Emperor, residing at Hanover, in the Kingdom of Prussia, Germany, invented new and useful Improvements in Compound Locomotives, of which the following is a specification.

This invention has reference to compound locomotives with four cylinders where one high-pressure cylinder and one low-pressure cylinder are arranged on each side of the engine; and the invention refers particularly to such compound locomotives of this class where the high-pressure and the low-pressure cranks of each side are mounted so as to be opposite or approximately opposite to each other and are set at right angles to the corresponding cranks of the opposite side of the engine. Thus the locomotive is provided with four steam-cylinders, of which one high-pressure cylinder and one low-pressure cylinder of either side coöperate like a compound engine, as distinguished from the compound locomotives with two cylinders where the high-pressure cylinder of one side coöperates with the low-pressure cylinder of the other side and the cranks of which are placed at an angle of, say, forty degrees, or nearly so.

The invention therefore refers to that kind of engines working with two high and respectively low pressure cylinders of different diameter where one high-pressure and one low-pressure cylinder are arranged on each side of the engine; and the invention refers particularly to means for the distribution of steam in the high and low pressure cylinders whereby the communicating passages between each low-pressure cylinder and the high-pressure cylinder are opened earlier and are closed later than the feeding-passages connecting the corresponding high-pressure cylinder with the steam-generator, so that a greater expansion of steam takes place in the low-pressure than in the high-pressure cylinder.

In the form of construction illustrated by Figures 1 to 8 of the accompanying drawings one single steam-distributing valve is used for each pair of high and low pressure cylinders, while in Fig. 9 is shown a form of construction with separate valves for each cylinder.

Fig. 1 is a side view of a locomotive embodying the invention. Fig. 2 is a vertical transverse section taken through the engine and the boiler according to the arrangement shown in Fig. 1. In Figs. 3 to 8 are illustrated diagrammatically and in longitudinal section several relative positions of the distributing-valve and of the high-pressure and of the low-pressure piston. Fig. 9 is a transverse section showing the employment of two separate valves for each high-pressure and low-pressure cylinder of either side. Fig. 10 illustrates by way of the well-known Zeuner diagram the relative position of the two pistons and the opening of the steam-passages for every given position of the crank and the degree of filling with steam in the two cylinders.

Similar and equivalent parts are marked with the same reference-characters in all the corresponding figures.

In the drawings, 1 is the high-pressure cylinder, and 2 is the low-pressure cylinder.

In the form of execution represented in the drawings on either side the high-pressure cylinders are placed outwardly, while the low-pressure cylinders are arranged inwardly. Steam is admitted to the high-pressure cylinders by means of the pieces of pipes 4, arranged on either side of the engine and which feed the steam to the high-pressure cylinders 1, 1, from which the steam in front of the pistons and which has remained from the former steam-admission period passes into the low-pressure cylinders 2 2 through one of the channels 5 5 6 6. From the low-pressure cylinders 2 the waste steam passes as exhaust through the passages 36 and into the single exhaust or blowing pipe 7.

The steam-distributing valve may preferably be constructed in form of a single piston-valve with steam-admission port arranged in its central outer surface and steam-exhaust ports in its outer parts, or the arrangement of the steam ports may be the reverse. In the arrangement shown in Figs. 1 to 8 a single steam-chest in common for high and low pressure cylinders is provided on either side of the engine. Openings 36 are provided in the end portions of said steam-chest for the escape of the exhaust-steam. In the walls of the steam-chest are provided openings forming the entrance, and escape ports of the steam for the high and low pressure cylinders. The arrangement is such that the admission-port 4 for the live-steam is situated in the middle of the cylinders 1 2. Through the channels 5 the steam passes into and out of the high-pressure cylinders, while the channels 6 serve for the passing of the steam into and out of the low-pressure cylinders. The ports or channels 5 are situated at a comparatively small distance from the admission-opening 4 and on both sides of the same. The ports 6, which serve to establish the communication of the low and high pressure cylinders with the single intermediate steam-chest 8, are arranged near the ends of the steam-chest, and they terminate at the inside of the low-pressure cylinder and slightly below the upper and lower covers of the same.

The single piston slide-valve 9 is so arranged and constructed as to present a greater lap for the high-pressure cylinder than for the low-pressure cylinder, so that the admission opening into the high-pressure cylinder is opened later than the opening of the low-pressure cylinder. For this purpose the piston slide-valve 11 is provided with ring-shaped collars 12 13, corresponding to the steam admission and outlet openings. Three collars of this kind are used in the present form of construction, of which the middle one 12 is considerably broader than the collars 13, arranged at the end of the cylindrical body 11. The collars may be provided with tightening-washers, so as to make a tight fit in the guide-way. The collar 12 is of such depth that it overlaps the entrance opening 4 on each side of the same for a broader space than the collars 13 13 overlap the ports 6 6. Hence the collar 12 opens the entrance-opening into the high-pressure cylinder later and closes it earlier than the collars 13 open and close the admission ports into the low pressure cylinders.

In the high-pressure cylinder 1 the piston 14 is movable, while the piston 15 moves in the low-pressure cylinder 2 of larger diameter than the high-pressure cylinder. The piston rods 15 17 pass, by means of stuffing boxes, through the covers of the cylinders 1 and 2. They are connected to the cranks 20 and 21 by means of pitman rods 18 and 19. As already mentioned, the cranks of each side of the engine are set off from each other for the value of a small angle in the direction of rotation of the wheels, so that the low-pressure crank possesses a lead relatively to the high-pressure crank which if extended beyond its pivot would include an angle of about four to six degrees with the low-pressure crank. In Figs. 1 and 2 the high-pressure cranks are arranged at the outside and the low-pressure cranks at the inside of the wheels; but the arrangement of the cranks relatively to the wheels may also be the reverse. Upon the right hand side of the engine the two cranks are placed at right angles with relation to the corresponding two cranks of the left hand side of the engine. Upon the crank shaft 22 is also mounted the link motion for the piston-valves 9, which may be actuated from the driving-shaft in any suitable manner.

The different positions of the single piston-valve and the corresponding positions of the pistons are shown diagrammatically in Figs. 3 to 8 of the drawings, of which Figs. 3 to 4 show the relative positions of the parts when the piston slide-valve moves to the left-hand side of the drawings. Figs. 5, 6, 7 and 8 show those positions which the pistons assume by the movements of the piston slide-valve toward the right-hand side of the drawings. Below these figures, which illustrate the relative positions of the several parts in longitudinal section, the manner of rotation and the momentary position of the crank-rods H L and of the valve-rod S are indicated diagrammatically by means of circles. The direction of rotation is indicated by the arrow 30. In the position shown in Fig. 3 of the drawings the piston slide-valve has been moved from its center position to the left. The high-pressure cylinder is still closed, while the left-hand collar 13 is just beginning to open the port 6, so that the steam in front of the high-pressure piston begins to flow into the low-pressure cylinder through the ports 5 6, while the low-pressure cylinder has arrived at its end position. In the position shown in Fig. 4 the slide-valve has moved farther on toward the left. The admission-port 4 is now also opened toward the right, so that fresh steam commences to flow in through 5 into the high-pressure cylinder. At the same time the high-pressure piston has arrived in its end position. In this position the low-pressure crank L has already passed beyond its dead-center point for the valve by the small angle above referred to, so that the low-pressure piston has already moved a short distance beyond its end position toward the right-hand side of the drawing. In the period of time during the positions shown in Figs. 3 and 4 the high-pressure and the low-pressure pistons have moved for some time in the same direction for part of their path. The previous movement of the high-pressure piston, during which it moves in the same direction with the low-pressure piston, is indicated by a dotted arrow 31. Upon reversing the movement of the high-pressure piston it will move in the direction of the arrow 32, while the low-pressure piston is now moving in the opposite direction. In the position shown in Figs. 5 to 8 the slide-valve has passed beyond its end position and is now moving toward the right-hand side of the drawings. In Fig. 5 the collar 12 has just closed the admission-port 4 for the high-pressure cylinder, while the ports 5 and 6, which effect the passage of the steam-cylinder, are still open. In the position shown in Fig. 6 the slide-valve has continued its movement and has now also effected the closing of the admission port 6 of the low-pressure cylinder by means of the collar 13, so that the pistons in both cylinders continue their movement only by the action of the expansion of steam. In Fig. 7 the slide has moved farther to the right, and in view of the greater lap of the collar 12 the admission-port for the high-pressure cylinder is still closed, while the ports of the low-pressure cylinder 5 6 at the right-hand side have just been opened again. At the same time the low-pressure piston has reached the end of its stroke. In the position of Fig. 8 of the drawings the slide-valve has moved still farther to the right, and it now uncovers also the port 4, which conducts the steam into the high-pressure cylinder through the left-hand port 5. In the meantime the high-pressure piston has reached its end position. Thus, even after the collar 12, which controls the entrance of live steam into the high-pressure cylinders has already effected the closing of the steam-port the steam in front of the high-pressure cylinder through the corresponding port 5, the space between the collars 12 and 13, and the steam-port 6. Inasmuch as the low-pressure cylinder, is opened for the entrance of steam earlier than and shut off later than the high-pressure cylinder, the ratio of expansion of the steam filled into the cylinders is greater for the low-pressure cylinder than for the high-pressure cylinder. In the Zeuner diagram (represented in Fig. 10) these results are shown diagrammatically in the usual well-known conventional manner. O B indicate the horizontal position of the high-pressure crank. O C indicate the corresponding position of the low-pressure crank. The directions A B and C D include the above-mentioned small angle with each other. The circle through A B C D corresponds to the so-called "crank-circle." If, for instance, the closing of the high-pressure cylinder takes place at half the stroke of the piston at the point *a*, which corresponds to the position O E of the crank, the entrance of steam into the low-pressure cylinders as appears from the opposite valve-circle is shut off at the point *b*, which corresponds to the position O G of the crank—that is to say, to the position C *e* of the piston. Hence the ratio of steam filling exceeds that prevailing in the high-pressure cylinder for the value of the path O C of the piston. The same takes place in the case of other proportions of steam filled into the high-pressure cylinder. In order to impart the same lead to the two cylinders, the lap O *a* of the high-pressure cylinder must exceed that of the low-pressure cylinder O *b*.

In the form of execution of the invention hereinbefore described the cylinders are arranged in the manner of the Woolf engine, the steam which is forced out from the high-pressure cylinder entering directly into the low-pressure cylinder.

Instead of one common steam-distributing valve two separate valves may be used as shown; for instance, in section in Fig. 9 of the drawings, in which case the engine may be operated with or without the use of an intermediate steam receptacle or receiver. (Not shown in the drawings.) Otherwise the action remains the same. In Fig. 9 the low-pressure cylinder is called 2′ and the high-pressure cylinder is designated 1′. The live-steam conduit leading to the high-pressure slide-valve is called 4′, and 4″ is the live-steam conduit leading to the pressure slide-valve. The exhaust flows freely from the end of the slide-valve casing into the channels 36, the same as in the form of execution of Figs. 2 to 8, and thence it enters into the common conduit 7, which may be connected to the dome and to the steam-whistle. The lead of the low-pressure piston which is produced by the herein-described position of the crank and which is necessary for producing higher proportions of steam-fillings in the respective cylinder may also be obtained by inclining the corresponding cylinders themselves in relation to each other for a correspondingly small angle or by arranging them at different levels, so that the crank-rods when in the middle position include a small angle of from four to six degrees, and by imparting to the low-pressure piston a lead relatively to the high-pressure piston, which lead corresponds to the said small angle.

It is of course understood that the high and low pressure cranks may be arranged on two different shafts connected to each other instead of on one common shaft 22.

Claims:

1. In four-cylinder compound locomotives, the combination with a driving-shaft and a steam-generator, of one high-pressure and one low-pressure cylinder and reciprocating pistons in each of the cylinders and cranks on the driving-shaft including an angle differing somewhat from one hundred and eighty degrees, all arranged on each side of the engine, and operating connections of the cranks with the pistons, each crank on either side of the engine being arranged at right angle relatively to the corresponding crank of the opposite side of the engine, a steam-distributing device between each high-pressure and the corresponding low-pressure cylinder, and means for producing a reciprocating movement of the steam-distributing device, steam-passages, and overlapping means on each steam-distributing device, the laps for each high-pressure cylinder being larger than those for each low-pressure cylinder.

2. In four-cylinder compound locomotives in combination, a high-pressure and a low-pressure cylinder of different diameters and pistons movable in said cylinders, connections of the high-pressure piston and of the low-pressure piston of either side of the engine with the engine-shaft and cranks connected to the high-pressure and to the low-pressure pistons and rigidly mounted on the engine-shaft, the crank of one of the pistons including an angle differing somewhat from one hundred and eighty degrees with the crank of the other piston of the same side of the engine, means to connect said cranks with the pistons, a steam-chest intermediate between each high-pressure and the corresponding low-pressure cylinder, connecting-passages between the steam-chest and the high and low pressure cylinders, steam-escape passages in the low-pressure cylinders, a piston-valve in common for each high-pressure and the corresponding low-pressure cylinder and movable in the interior of the steam-chest, rings arranged steam-tight, in the steam-chest and surrounding the said piston-valve, the middle ring having a larger outer surface than the other rings, a steam-entrance passage for live steam in the walls of the high-pressure cylinder, connecting-passages between the high-pressure cylinder and the lower end of the low-pressure cylinder and opening out a small distance from the steam-entrance opening, connecting-passages between the steam-chest and the low-pressure cylinder opening out into an aperture provided in the walls of the low pressure cylinder and situated in the proximity of the upper and lower ends of the low-pressure cylinder, exhaust-openings near the ends, of the steam-chest and means for imparting a reciprocating movement to the piston-valve and the entrance-shaft.

3. In a compound locomotive, the combination with a high pressure cylinder and a low pressure cylinder, of reciprocating pistons in said cylinder, driving cranks with which said pistons are operatively connected, the angle between the driving cranks differing slightly from 180 degrees, a distributing device controlling the supply of motor fluid to and from said cylinders, and means for actuating said distributing device.

4. In a compound locomotive, the combination with a high pressure cylinder and a low pressure cylinder, of reciprocating pistons in said cylinder, driving cranks with which said pistons are operatively connected, the angle between the driving cranks differing somewhat from 180 degrees, a distributing device controlling the supply of motor fluid to and from said cylinders, means for actuating said distributing device, and overlapping means on said distributing device, the lap for the high pressure cylinder being larger than that for the low pressure cylinder.

5. In a 4-cylinder compound locomotive, the combination with the high pressure cylinder and a low pressure cylinder arranged on each side of the locomotive, of reciprocating pistons in said cylinders, driving cranks with which said pistons are operatively connected, the angle between the driving cranks on each side of the locomotive differing slightly from 180 degrees, each crank on either side of the engine being arranged at right angles relatively to the corresponding crank on the opposite side of the engine, a distributing device between each high pressure and the corresponding low pressure cylinder, and means for actuating said distributing device.

6. In a 4-cylinder compound locomotive, the combination with the high pressure cylinder and the low pressure cylinder arranged on each side of the locomotive, of reciprocating pistons in said cylinders, driving cranks with which said pistons are operatively connected, the angle between the driving cranks on each side of the locomotive differing somewhat from 180 degrees, each crank on either side of the engine being arranged at right angles relatively to the corresponding crank on the opposite side of the engine, a distributing device between each high pressure and the corresponding low pressure cylinder, means for actuating said distributing device, and over-lapping means on each distributing device, the laps for each high pressure cylinder being larger than those for each low pressure cylinder.

In testimony whereof we have signed our names to this specification in the presence of two subscribing witnesses.

THOMAS WILLIAM WORSDELL.
RICHARD HERBERT LAPAGE.
JOHN CHARLES TAITE.

Witnesses to the signature of Thomas William Worsdell:
PHILIP RHEAM,
WM. HOUGHTON.

Witnesses to the signature of Richard Herbert Lapage:
C. A. WYLDE,
CECIL V. FINCH.

Witnesses to the signature of John Charles Taite:
F. J. DAVIS,
C. A. WILLIAMS.